Jan. 5, 1965          B. O. BURSON          3,164,765
ELECTRIC GENERATING SYSTEM WITH VOLTAGE REGULATOR
Filed Dec. 14, 1961
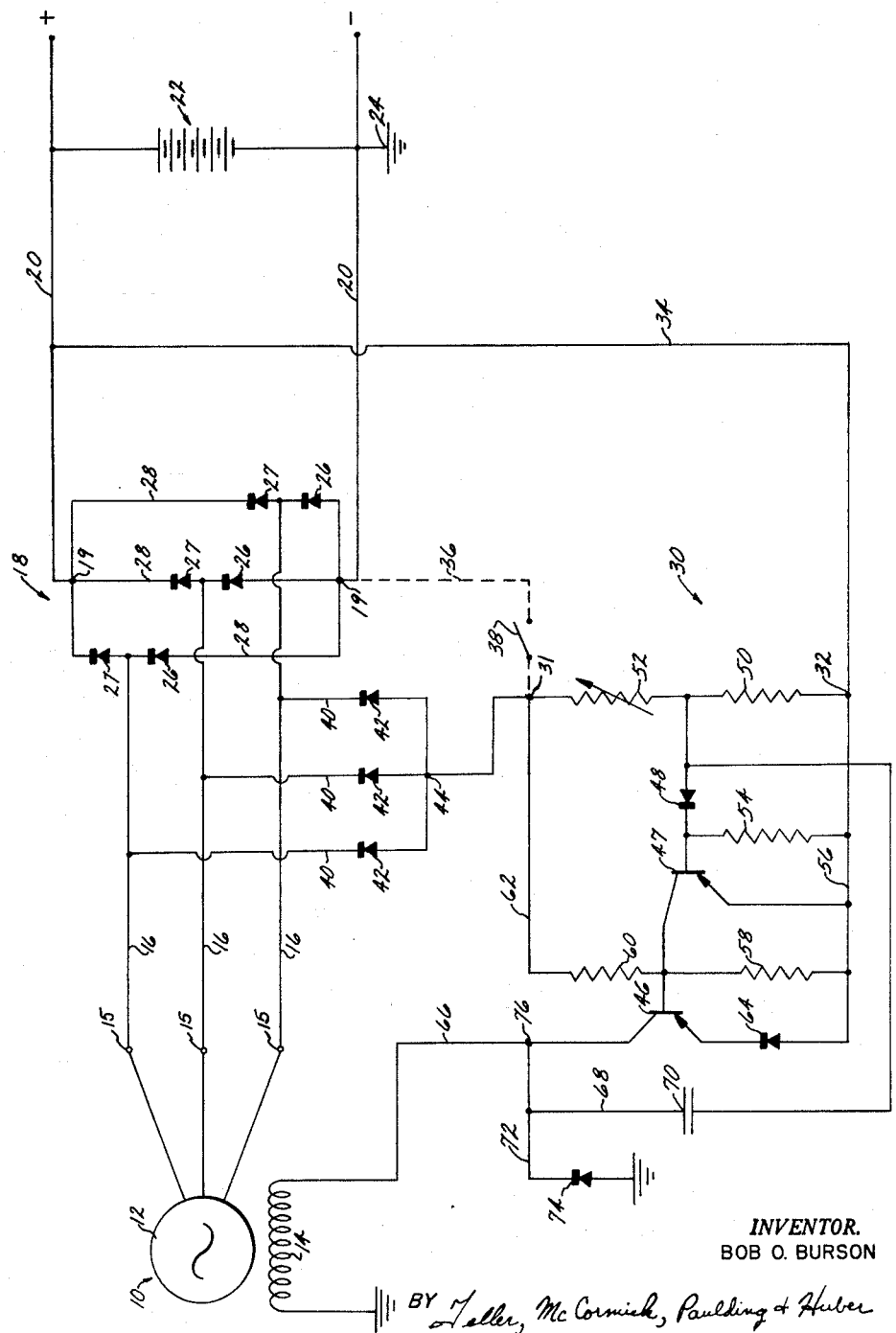
*INVENTOR.*
BOB O. BURSON
BY Teller, McCormick, Paulding & Huber
ATTORNEYS 3,164,765
ELECTRIC GENERATING SYSTEM WITH
VOLTAGE REGULATOR
Bob O. Burson, Longmeadow, Mass., assignor, by mesne assignments, to Elci Products Corporation, Carolina, Puerto Rico, a corporation of Puerto Rico
Filed Dec. 14, 1961, Ser. No. 159,299
9 Claims. (Cl. 320—57)

This invention relates to electric generating systems for motor vehicles, and deals more particularly with such generating systems which include a transistorized regulator for controlling the output voltage of the generating means.

The generating and regulating system of this invention is of the type including an alternating current generator for charging a storage battery and for providing electrical power for various other purposes. The generator may produce either a single phase or a polyphase voltage which is then rectified to provide a substantially direct current output. Connected with the output of the generator is a transistorized voltage regulator for controlling the field excitation of the generator in such a manner as to provide for a substantially constant voltage across the battery and the output terminals despite changes in the load or the state of charge of the battery.

The use of transistorized voltage regulators with alternating current generators in a vehicle generating system is not new. In all previously known systems, however, it has been necessary to provide a mechanical switch for electrically disconnecting the voltage regulator from the remainder of the system when the generator is at rest in order to prevent discharging of the battery. The switch may be part of the ignition switch or may be a separate switch responsive to an engine condition such as the oil pressure. Nevertheless, one of the important features of a transistorized regulator is the elimination of moving parts and contacts to avoid mechanical failure, and the need for a mechanical switch for connecting and disconnecting the regulator to and from the system detracts from this advantage of the transistorized regulator.

An object of this invention is therefore to provide an improved alternating current-transistor regulator generating system for a motor vehicle in which system the need for mechanically switching the regulator into and out of the system is eliminated.

Another object of this invention is the provision of an improved generating system as mentioned in the preceding paragraph wherein the elimination of the mechanical switch is accomplished with a minimum of parts and at a minimum cost.

A further object of this invention is to provide a vehicle generating system which eliminates all moving parts, such as relays, switches and contacts, from the control portion of the system and in which the operation of the system is dependent only on the rotation of the generator so that the system need not be interconnected with the engine or ignition controls. In keeping with this object, a further object is to provide a generating system which can be used on engines in which electrical controls, such as an ignition switch, are not used for starting or stopping the engine.

A more specific object of the invention is to provide an alternating current-transistor regulator generating system having an artificial plus or minus terminal for one side of the input to the regulator which terminal is maintained at or near the potential of the corresponding output terminal of the generator while the generator is operating so that a voltage signal appears across the input to the regulator but which terminal is isolated from the generator output when the generator is stopped to prevent drain of the battery.

Other objects and advantages of the invention will be apparent from the following description and from the accompanying drawing forming a part thereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing is a schematic wiring diagram illustrating the circuit arrangement of a vehicle generating system embodying the present invention.

Referring to the drawing, a vehicle generating system embodying this invention is shown therein as comprising an alternator indicated generally at 10 and including an armature 12 and a field coil 14. The illustrated alternator 10 is designed to provide a three-phase output voltage and includes three output terminals 15, 15 to which are connected three output lines 16, 16. The alternator serves as a source of alternating current potential which appears across the lines 16, 16 and is adapted to be driven by the engine of the vehicle. The alternator may be of various different constructions, and may for example be similar to the one shown in the copending application of Terry and Burson, Serial Number 88,531 entitled Inductor Alternator Having a Salient Pole Stator Construction, filed February 10, 1961.

Associated with the alternator 10 is a rectifier means, indicated generally at 18 which serves to convert the three-phase alternating current potential delivered by the lines 16, 16 into a direct current potential. The direct current potential output from the rectifier 18 is imposed across two lines 20, 20 which are connected with the two output terminals 19, 19 of the rectifier 18. Connected between the lines 20, 20 and forming a part of the output load circuit is a battery 22 which serves to provide electrical power for the vehicle when the engine is stopped and which is recharged by the alternator 10 and rectifier 18 when the vehicle engine is running. It will be noted that the illustrated system has a negative ground, the bottom line 20 being connected to ground, as at 24, and to the negative side of the battery 22.

The rectifier means 18 may be of various different suitable constructions, but preferably, and as illustrated, comprises six silicon power diodes 26, 26 and 27, 27, arranged to form a conventional three-phase bridge rectifier. That is, the rectifier 18 includes three parallel lines 28, 28. In each line 28 are two diodes 26 and 27 connected in series and arranged to conduct current from one output terminal of the rectifier to the other. For example, in the illustrated rectifier the diodes 26, 26 and 27, 27 are arranged to conduct current passing from the bottom output terminal to the top output terminal but to block current from passing in the opposite direction. Each line 16 from the alternator 10 is in turn connected with a respective one of the parallel rectifier lines 28, 28 at a point intermediate to the two diodes in the associated line.

Associated with the illustrated system is a transistorized voltage regulator, indicated generally at 30, for controlling or regulating the output voltage appearing across the rectifier terminals 19, 19 when the vehicle engine is running in order to obtain proper charging of the battery 22. The regulator controls the output voltage by regulating the amount of current passing through the alternator field 14. It includes two input terminals 31 and 32 and operates in a somewhat conventional manner to change the field current in response to changes in the voltage signal applied across the input terminals 31 and 32.

In the past it has been the usual practice to connect a regulator, such as that shown at 30, directly across the output terminals of the rectifier or in parallel with the battery so that the same voltage as applied to the battery is applied to the input terminals of the regulator. This sort of connection is illustrated in the drawing by the line 34 connected between the upper or positive line 20 and the lower input terminal 32 of the regulator, and by the broken line 36 connected between the bottom or negative line 20 and the upper input terminal 31 of the regulator. With such a connection it will be noted that it is necessary to provide a mechanical switch 38 in the line 36 for electrically disconnecting the regulator from the lines 20, 20 when the vehicle engine is stopped. This is due to the fact that the transistor regulator provides a resistive load circuit for the battery through which circuit current may pass, thereby draining the battery, if the alternator is stopped with the switch closed. The switch 38 is, however, subject to mechanical failure, and as mentioned previously one of the objects of this invention is to provide a system wherein the switch is eliminated.

The line 36 and the switch 38 form no part of the present system and are omitted. In place of this line and switch the present system includes a means for providing an artificial ground or negative potential at the regulator input terminal 31 and which ground or negative potential is maintained while the alternator is running, the same means also serving to isolate the terminal 31 from the negative line 20 so that no drain of the battery through the regulator will occur when the alternator is stopped. In its simplest sense this means comprises a separate rectifier means associated with the output lines 16, 16 of the alternator, the latter rectifier means being arranged to rectify the alternating current potential appearing across the lines 16, 16 and to thereby maintain a direct current negative potential on the upper input terminal 31. The main power rectifier 18 isolates the lines 16, 16 from the battery so that no reverse current can flow from the battery and through the lines 16, 16 when the alternator is stopped. Therefore, by deriving the input signal for the regulator from the lines 16, 16 the regulator is likewise isolated from the battery.

The auxiliary rectifier means used to establish a negative or ground potential at the regulator input terminal 31 may take various different forms but preferably, and as illustrated, consists of three lines 40, 40 each connected between a respective one of the lines 16, 16 and a common output terminal 41, the terminal 41 in turn being connected with the regulator input terminal 31 by a line 43. In each of the lines 40, 40 is a diode 42 arranged to conduct current from the input terminal 31 to the associated line 16 but to resist current flow in the reverse direction. The diodes 42, 42 are preferably silicon diodes and since they pass only a relatively small signal current may be made small and relatively low in cost.

In order to understand the operation of the three diodes 42, 42 it should be noted that these three diodes actually form one-half of a three-phase bridge rectifier. The other half of this rectifier is comprised of the three diodes 27, 27 of the main rectifier 18. The two output terminals of this rectifier are the upper output terminal 19 of the main rectifier 18 and the common terminal 44 of the three diodes 42, 42. Between these two output terminals is the voltage regulator 30 which may be considered as a resistive load. Since the terminal 19 is also connected to the positive side of the battery 22 the effect of the rectifier comprised of the diodes 42, 42 and 27, 27 will be to suppress the potential of the terminal 31 below that of the positive side of the battery by an amount equal to the full-wave rectified potential of the alternator output.

When the peak value of the alternating current potential supplied by the alternator is less than the battery potential no current will flow from the main rectifier 18. Under this condition the auxliliary rectifier comprised of the diodes 42, 42 and 27, 27 will serve nevertheless to suppress the potential of the input terminal 31 below the potential of the positive line 20, even though the potential will not be driven entirely to the ground potential and will be slightly positive with respect to ground. When the alternator 10 does produce a sufficiently large output voltage to overcome the battery potential and conduct through the rectifier 18, the potential at the terminal 31 will be maintained very close to that of the negative line 20, or close to ground potential, and therefore the regulator will operate as though its two input terminals were connected directly across the lines 20, 20 in parallel with the battery. Under normal operation the output of the alternator is sufficiently large that some charging current will flow through the rectifier 18 and the battery 22.

The transistorized regulator 30 may be of various different circuit arrangements without departing from the invention. The particular regulator illustrated by itself forms no part of the invention, however, its construction and operation will be described below in order that the operation of the entire generating system may be more fully understood.

The regulator 30 includes two PNP transistors 46 and 47 and a Zener diode 48. The anode of the Zener diode 48 is connected to the middle of a voltage divider comprising two resistors 50 and 52 connected in series between the input terminals 31 and 32, the resistor 52 being adjustable. The cathode of the Zener diode is connected to the base of the transistor 47 and to one side of a resistor 54. The other side of the resistor 54 is connected to a line 56 connected to the input terminal 32. The emitter of the transistor 47 is connected to the line 56, and its collector is connected to the base of the transistor 46. The base of the transistor 46 is also connected to the mid-point of a voltage divider comprising the resistors 58 and 60 connected between the line 56 and the line 62, the line 62 being connected with the input terminal 31. The emitter of the transistor 46 is connected through a silicon diode 64 to the line 56. The collector is in turn connected by a line 66 to the field coil 14 of the alternator 10. Also connected to the line 66 is a line 68 connected at its other end to the positive side of the Zener diode 48 and including a capacitor 70 and another line 72 is connected between ground and the line 66 and contains a silicon diode 74 arranged to conduct from ground to the line 66.

When the alternator is at rest, the two regulator input terminals 31 and 32 are both at the same positive potential of the battery due to the isolation afforded by the main rectifier 18. As the alternator starts operating, it initially produces a small output voltage as a result of the residual magnetism of its field poles. This output drives the terminal 31 of the voltage regulator negative as a result of the rectifying action of the diodes 42, 42 and 27, 27. This, it will be noted, puts a negative bias voltage on the base of the transistor 46 through the voltage divider comprised of the resistors 58 and 60 and thereby produces a base current which results in an emitter to collector current. This collector current in turn passes through the field coil 14 and causes the output voltage of the alternator to quickly build-up.

When the output of the alternator builds up to the point where the peak values of the alternating current exceed the battery potential, current will flow through the rectifier 18 to charge the battery and will also flow through the rectifier provided by the diodes 42, 42 and 27, 27 to cause the potential of the terminal 31 to be driven substantially to the ground potential. Thus, the voltage signal appearing across the input terminals of the voltage regulator will be substantially equal to that appearing across the battery. This increased voltage signal increases the negative bias on the base of the transistor 46 so as to cause a still larger collector current to flow through the field winding 14, thereby still further building up the alternator output voltage and the voltage appearing across the regulator input terminals. This effect is cumulative until the voltage across the regulator input terminals is sufficiently large to cause the voltage appearing across the Zener diode 48 to exceed its reverse breakdown voltage.

It will be noted that before breakdown of the Zener diode, very little current passes through the resistor 54 so that the base of the transistor 47 is maintained at substantially the same potential as the input terminal 32. Accordingly, the reverse voltage which appears across the Zener diode is substantially the same as the voltage which appears across the resistor 50. Before the Zener diode breaks down, the bias on the base of the transistor 47 is substantially zero so that the transistor is substantially non-conducting. That is, the emitter to collector current is substantially zero. After the Zener diode breaks down, current flows through the diode and the resistor 54 to drive the base of the transistor 47 negative with respect to the input terminal 32. This in turn renders the transistor 47 conducting, lowering the emitter to collector resistance and permitting a current to flow from the emitter to the collector, which current in turn reduces, or drives toward positive, the negative bias on the base of the transistor 46.

This change in the bias voltage on the base of the transistor 46 reduces the current passing from its collector to the field coil 14, and thereby reduces the output voltage of the alternator 10. This in turn reduces the charging voltage appearing across the battery 22 and the voltage appearing across the input terminals of the voltage regulator. As the voltage across the regulator input terminals is reduced, the voltage across the Zener diode is likewise reduced until the latter is driven toward its non-conducting state. When the Zener diode does stop conducting the biases on the bases of the transistors 47 and 46 are changed to cause an increased field current in the alternator. Thus, the Zener diode causes the desired regulating action by switching the transistors on and off, or between conducting and non-conducting states, as the voltage across the diode rises above or falls below its breakdown voltage. The output voltage of the alternator is therefore maintained substantially constant at the value corresponding to that required to produce a voltage across the resistor 50 equal to the reverse braakdown voltage of the Zener diode. It will also be noted that by adjusting the resistor 52 the value at which the output voltage is maintained by the regulator may be varied.

During stoppage of the alternator 10, or when the transistor 46 is in a cut-off condition, the diode 64 serves to decrease the leakage current through the transistor 46, to substantially eleminate drain on the battery. Without the diode in the emitter line, the leakage current through the emitter and collector circuit is usually relatively low but may reach a high value at high temperatures. At the values of leakage current normally encountered it is a characteristic of the diode 64 that its forward resistance is quite high. Therefore, the diode acts to add a high resistance which of itself reduces the leakage current through the line. Furthermore, the presence of this resistance in the emitter line causes a voltage drop to exist across the diode which lowers the potential of the emitter making it negative with respect to the base of the transistor 46. In other words, a reverse bias is placed between the emitter and base which still further increases the leakage resistance to still further reduce the leakage current. The net effect of the inclusion of the diode 64 in the emitter line is therefore to drastically lower the leakage current. By this means the leakage current may be reduced to as low as 3 or 4 microamperes. Nevertheless, a normal leakage current is not objectionable in many applications and therefore the diode 64 may often be omitted, if desired.

The diode 74 is used to provide a reverse current discharge path for the field coil. That is, the diode serves to remove the high peak voltage which would otherwise be induced in the field coil, and applied to the transistor 46, when the latter transistor is cut off to suddenly stop the flow of current through the field coil.

The capacitor 70 is used to improve the switching functions of the two transistors 46 and 47 by providing a positive feedback to the Zener diode 48. At this point it should first be noted that the breakdown of the Zener diode does not occur at a precise point along the reverse voltage scale, but actually occurs over a small voltage range and over which range the diode changes gradually from a substantially fully conducting state to a substantially fully non-conducting state. The operation of the voltage regulator 30 is further such that, without the capacitor 70 or other positive feedback means, the Zener diode may never be rendered fully conducting or fully non-conducting, but instead may be operated always within its transistor range. As a result of this the transistors 46 and 47 may not be biased so as to operate at either fully saturated or fully cutoff conditions. Operation at either full saturation or full cutoff is desirable as these are the points of minimum power dissipation in the transistors. Operation of either transistor between points other than those of full saturation and full cutoff may cause the actual power dissipation to exceed the maximum rated dissipation and to thereby destroy the transistor.

To understand the operation of the capacitor 70 assume first that the Zener diode 48 is conducting as a result of a high voltage across the regulator input terminals 31 and 32. At this time the transistor 46 is so biased that little current flows from its collector and through the field coil 14. As the input voltage of the regulator drops, however, the reverse voltage across the Zener diode is reduced so that the latter is driven toward the non-conducting state. This, as explained previously, causes the transistor 46 to conduct more heavily so that an increased current flows through the field coil. In other words, the emitter to collector resistance of the transistor 46 is reduced and the potential of the point 76 is therefore increased. This increased voltage signal at the point 76 is in turn fed back to the line 68 and the capacitor 70 and increases the voltage on the positive side of the Zener diode. The effect of this is to still further reduce the reverse voltage across the Zener diode so that the latter is quickly driven to the substantially fully non-conducting state. This in turn causes the bias on the base of the transistor 47 to be reduced to practically zero so that the transistor is fully cut off. As a consequence of this the bias on the base of the transistor 46 is driven to the saturation point so that it operates to pass a maximum collector current with minimum emitter to collector resistance.

When the voltage across the input terminals of the regulator thereafter rises, the reverse voltage across the Zener diode is increased so that the latter is driven toward the conducting state. This causes the transistor 46 to conduct less heavily so that less current flows through the field coil 14. At the same time, and as a result of this, the potential of point 76 is reduced, and this reduced voltage signal is transmitted by the line 68 and the capacitor 70 to the positive side of the Zener diode. This in turn still further increases the reverse voltage across the Zener diode and causes it to be quickly driven to the substantially fully conducting state. Accordingly, the bias on the base of the transistor 47 is driven to the saturation point, thereby making the transistor 47 fully conducting with a low emitter to collector resistance. This in turn causes the base of the transistor 46 to become approximately zero so that the transistor is substantially fully cut off.

The overall effect of the above-described operation of the capacitor 70 is that the transistors 46 and 47 and the Zener diode 48, when switching occurs, quickly switch from the "full on" or conducting state to the "full off" or non-conducting state, or vice versa. This as mentioned, is highly desirable in order to reduce the heat dissipated in these components.

The invention claimed is:

1. A vehicle generating system comprising, a source of alternating current potential having a plurality of output terminals, a bridge rectifier connected with said output terminals of said source for converting said alternating current potential to a direct current potential and which rectifier means includes two output terminals, a voltage regulator for controlling the output potential of said source and which voltage regulator includes first and second input terminals, the first of said regulator input terminals being connected to one of said rectifier output terminals, and a second rectifier connected between said output terminals of said source and the second input terminal of said regulator, said second rectifier comprising half of a bridge rectifier and cooperating with half of said first rectifier to convert said alternating current potential of said source into a direct current potential across said regulator input terminals.

2. A generating system for a vehicle having a direct current load circuit including a storage battery, said system comprising a source of alternating current potential having a plurality of output terminals, a rectifier means connected with said output terminals of said source for converting said alternating current potential to a direct current potential and including two output terminals adapted for connection with said load circuit, a voltage regulator for controlling the output potential of said source and which regulator includes two input terminals, one of said regulator input terminals being connected to one of the output terminals of said rectifier, a line connected between the other of said regulator input terminals and one of the output terminals of said source, and a diode in said line for conducting current in one direction with respect to said latter regulator input terminal and for resisting its flow in the opposite direction.

3. A generating system for a vehicle having a direct current load circuit including a storage battery, said system comprising a source of alternating current potential having a plurality of output terminals, a rectifier means connected with said output terminals of said source for converting said alternating current potential to a direct current potential and including two output terminals adapted for connection with said load circuit, a voltage regulator for controlling the output potential of said source and which regulator includes two input terminals, one of said regulator input terminals being connected to one of the output terminals of said rectifier, a plurality of lines each connected between the other of said regulator input terminals and a respective one of said output terminals of said source, and a corresponding number of diodes each located in a respective one of said lines and arranged to conduct current in the same direction with respect to said other regulator input terminal.

4. A generating system for a vehicle having a direct current load circuit including a storage battery, said system comprising a three-phase alternator having three output terminals and also have a field winding adapted for energization by a direct current potential, a rectifier means connected with said output terminals of said alternator for converting the alternating current potential output thereof into a direct current potential and including two output terminals adapted for connection with said load circuit, a voltage regulator having two input terminals and adapted to control the energization of said field winding in response to the potential appearing across said input terminals, one of said regulator input terminals being connected to one of the output terminals of said rectifier, three lines each connected between the other of said regulator input terminals and a respective one of said output terminals of said source, and three diodes each located in a respective one of said lines and arranged to conduct current in the same direction with respect to said other regulator input terminal.

5. A vehicle generating system for a vehicle having a direct current load circuit including a storage battery, said system comprising a source of alternating current potential having a plurality of output terminals, two output terminals adapted for connection to said load circuit, a plurality of lines connected in parallel between said two output terminals and which lines are equal in number to the number of said output terminals of said source, each of said parallel lines including two diodes connected in series and arranged to conduct current from one of said two output terminals to the other, each of said output terminals of said source being connected to a respective one of said parallel lines at a point between the two diodes in said line, a voltage regulator having two input terminals and operable to control the output potential of said source in response to the voltage appearing across said input terminal, one of said regulator input terminals being connected to one of said two output terminals, and a plurality of lines equal in number to the number of said output terminals of said source and each connected between the other input terminal of said regulator and a respective one of said output terminals of said source, each of said latter lines including a diode and all of which diodes are arranged to conduct current in the same direction relative to said other input terminal.

6. A vehicle generating system comprising, an alternator having a direct current field winding and an armature with a plurality of output terminals, a first rectifier means connected with said alternator output terminals for converting the alternating current output potential of said alternator into a direct current potential and which rectifier means includes two output terminals, a voltage regulator having two input terminals and operable to control the energization of said field winding in response to the potential appearing across said input terminals, the first of said regulator input terminals being connected to one of said rectifier output terminals, and second rectifier means connected between said output terminals of said alternator and the second input terminal of said regulator and arranged to maintain said second input terminal at a potential different from that of the first input terminal when an alternating current potential appears across the output terminals of said source.

7. A generating system for a direct current load circuit, said system comprising a source of alternating current potential having a plurality of output terminals, a voltage regulator associated with said source for controlling the potential appearing at said output terminals and which regulator includes two input terminals, a first rectifier means connected with said output terminals of said source and having two output terminals of relatively opposite polarity adapted for connection with said load circuit, said voltage regulator having one of its input terminals connected to one of said output terminals of said first rectifier means, and a second rectifier means connected between said source and the other input terminal of said regulator for maintaining said latter input terminal at a potential approximately equal to that of the other of said output terminals of said first rectifier means.

8. A generating system as defined in claim 7 further characterized by said source of alternating current potential comprising an alternator having a field winding and said regulator comprising means for controlling the amount of current flowing through said field winding in response to the signal voltage applied to its input terminals.

9. A generating system for a direct current load circuit, said system comprising a source of alternating current potential having a plurality of output terminals and a field, a first rectifier connected with said output terminals of said source and having two output terminals, means connecting one side of said field to one of said rectifier output terminals and a line connecting the other side of said field to the other of said rectifier output terminals, a device in said line for varying the flow of current through said line to said field, a control means having two input terminals which control means is associated with said device and operative to cause said device to vary the flow of current to said field in response to the potential difference applied across said input terminals, one of said input terminals being connected with one of said rectifier terminals, and a second rectifier connected between the output terminals of said source and the other input terminal of said control means for maintaining said latter input terminal at a potential approximately equal to that of the other of said rectifier terminals.

References Cited in the file of this patent
UNITED STATES PATENTS 3,009,091    Hallidy _____ Nov. 14, 1961